US012654937B2

(12) United States Patent
    Skålerud

(10) Patent No.:     US 12,654,937 B2
(45) Date of Patent:      Jun. 16, 2026

(54) ACCESS STATION

(71) Applicant: Autostore Technology AS, Nedre Vats (NO)

(72) Inventor: Amund Skålerud, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 569 days.

(21) Appl. No.: 18/000,897

(22) PCT Filed: Jun. 9, 2021

(86) PCT No.: PCT/EP2021/065513
     § 371 (c)(1),
     (2) Date: Dec. 6, 2022

(87) PCT Pub. No.: WO2021/259644
     PCT Pub. Date: Dec. 30, 2021

(65) Prior Publication Data
     US 2023/0219751 A1      Jul. 13, 2023

(30) Foreign Application Priority Data

Jun. 24, 2020    (NO) .................................... 20200738

(51) Int. Cl.
     *B65G 1/04*          (2006.01)
     *B65G 29/00*         (2006.01)
     *B65G 65/23*         (2006.01)
(52) U.S. Cl.
     CPC ........... *B65G 1/0464* (2013.01); *B65G 29/00* (2013.01); *B65G 65/23* (2013.01)
(58) Field of Classification Search
     CPC ...... B65G 1/0464; B65G 29/00; B65G 65/23; B65G 1/0478; B65G 1/1378; B65G 1/065;

(Continued)

(56) References Cited

U.S. PATENT DOCUMENTS 4,003,461 A * 1/1977 Speaker ................. B65G 47/80
                                                          414/744.8
2017/0369247 A1  12/2017 Bouche et al.
(Continued)

FOREIGN PATENT DOCUMENTS

CN          103153795 A       6/2013
CN          107207159 A       9/2017
(Continued)

OTHER PUBLICATIONS

Le Huy Anh, Examination Report Notice for Vietnamese Patent Application No. 1-2023-00129, dated Mar. 28, 2025, 4 pages, pub. by The Intellectual Property Office of Vietnam, Hanoi, Vietnam.

(Continued)

*Primary Examiner* — Michael Collins
(74) *Attorney, Agent, or Firm* — Baker Botts L.L.P.

(57)                  ABSTRACT

An access station for a storage system includes at least one container holder arranged to rotate about an axis of rotation. The axis of rotation is inclined at a first angle relative to a vertical. The container holder is arranged to accommodate a storage container and is configured such that a centreline of the storage container when supported by the container holder is inclined at a second angle relative to the axis of rotation. The container holder may rotate between a first position, where the centreline of an accommodated storage container is vertical, and a second position being opposite the first position relative to the axis of rotation. The centreline of an accommodated storage container is inclined at a third angle relative to the vertical. The third angle is equal to the sum of the first angle and the second angle.

16 Claims, 6 Drawing Sheets

(58) Field of Classification Search
CPC ............ B65G 2201/0235; B65G 47/80; B65G 47/904
See application file for complete search history.

(56) References Cited

U.S. PATENT DOCUMENTS

| | | | |
|---|---|---|---|
| 2020/0391941 A1* | 12/2020 | Austrheim | ........... B65G 1/0492 |
| 2021/0139239 A1* | 5/2021 | Austrheim | ........... B65G 1/0492 |
| 2023/0382646 A1 | 11/2023 | Austrheim et al. | |

FOREIGN PATENT DOCUMENTS

| | | | |
|---|---|---|---|
| CN | 111225863 | A | 6/2020 |
| JP | S4952092 | A | 5/1974 |
| JP | 2023550911 | A | 12/2023 |
| NO | 317366 | B1 | 10/2004 |
| WO | 2012/026824 | A1 | 3/2012 |
| WO | 2014/075937 | A1 | 5/2014 |
| WO | 2014/090684 | A1 | 6/2014 |
| WO | 2015/140216 | A1 | 9/2015 |
| WO | 2015/193278 | A1 | 12/2015 |
| WO | 2016/120375 | A1 | 8/2016 |
| WO | 2018/146304 | A1 | 8/2018 |
| WO | 2018/233886 | A1 | 12/2018 |
| WO | 2019/076516 | A1 | 4/2019 |

OTHER PUBLICATIONS

Lijiao Wei, First Office Action for Chinese Patent Application No. 2021800444956, dated Jan. 27, 2025, 13 pages, pub. by SIPO, Beijing, China.
Thenert, Alexander, Office Action for European Patent Application No. 21733081.0, dated Feb. 12, 2025, 5 pages, pub. by the EPO, Rijswijk, Netherlands.
Search Report for corresponding Norwegian Application No. 20200738, mailed Jan. 7, 2021 (2 pages).
International Search Report for corresponding International Application No. PCT/EP2021/065513, mailed Sep. 22, 2021 (4 pages).
Written Opinion for corresponding International Application No. PCT/EP2021/065513, mailed Sep. 22, 2021 (9 pages).
Kato, Mitsuyoshi, Office Action in JP2022578827, mailed Jul. 3, 2025, 6 pages, Japan Patent Office, Tokyo, Japan.
Anonymous, Office Action in Korean patent application 1020237002069, mailed Jan. 14, 2026, 13 pages, pub. by Korean Intellectual Property Office, Daejeon, Korea.

* cited by examiner

ACCESS STATION

FIELD OF THE INVENTION

The present invention relates to an access station and a storage system comprising such an access station.

BACKGROUND AND PRIOR ART

FIG. 1 discloses a typical prior art automated storage and retrieval system 1 with a framework structure 100 and FIGS. 2 to 4 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102,103 may typically be made of metal, e.g. extruded aluminium profiles.

The framework structure 100 of the automated storage and retrieval system 1 comprises a rail system 108 arranged in a grid pattern across the top of the framework structure 100, on which rail system 108 a plurality of container handling vehicles 201,301 are operated to raise storage containers 106 from, and lower storage containers 106 into, the storage columns 105, and also to transport the storage containers 106 above the storage columns 105. The horizontal extent of one of the grid cells 122 constituting the grid pattern is marked by thick lines.

The rail system 108 (i.e. a rail grid) comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a container lifting assembly 2 (shown in FIG. 4) for vertical transportation of storage containers 106, e.g. raising a storage container 106 from, and lowering a storage container 106 into, a storage column 105. The container lifting assembly 2 comprises a lifting frame 3 having one or more gripping/engaging devices 4 adapted to engage a storage container 106 and guide pins 304 for correct positioning of the lifting frame 3 relative to the storage container 106. The lifting frame 3 can be lowered from the vehicle 201,301 by lifting bands 5 so that the position of the lifting frame with respect to the vehicle 201,301 can be adjusted in a third direction Z which is orthogonal the first direction X and the second direction Y.

The lifting frame 3 (not shown) of the container handling vehicle 201 in FIG. 2 is located within a cavity of the vehicle body 201a.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors may be employed to transport the storage containers between the port columns 119,120 and the access station If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

To avoid requiring a conveyor system, some access stations may have a section arrangeable directly below a port column such that a storage container may be transferred directly to the access station. Access stations suitable for being arranged below a port column are disclosed in for example WO 2012/026824 A1 and WO 2016/120375 A1. The access station disclosed in WO 2016/120375 A1 features a storage container holder and a mechanism for tilting the storage container holder towards an operator to provide an ergonomically improved work position.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

As discussed above, some prior art access stations feature storage container holders that may be tilted to provide improved ergonomics. However, the mechanism for tilting the storage container is quite complex and it would be advantageous to have a simpler and less service intensive solution.

The object of the present invention is to provide an improved access station able to receive a storage container and tilt the storage container when presented to an operator, and a storage system comprising such an access station.

SUMMARY OF THE INVENTION

The present invention is defined by the attached claims and in the following:

In a first aspect, the present invention provides an access station for a storage system, the access station comprises at least one container holder arranged to rotate about an axis of rotation, wherein the axis of rotation is inclined at a first angle relative to a vertical; and the container holder is arranged to accommodate a storage container and is configured such that a centreline of the storage container when supported by the container holder is inclined at a second angle relative to the axis of rotation, wherein the container holder may rotate between a first position, where the centreline of an accommodated storage container is vertical, and a second position being opposite the first position relative to the axis of rotation, where the centreline of an accommodated storage container is inclined at a third angle relative to the vertical, the third angle being equal to the sum of the first angle and the second angle.

The centreline of a storage container is intended to define a line being perpendicular to a plane of the storage container bottom and intersecting the centre of said bottom. Alternatively, the centreline of a storage container may be defined as the central axis of the storage container.

In other words, the container holder may rotate/orbit 180 degrees about the axis of rotation between a first position, wherein an accommodated storage container is horizontal, i.e. has an opening facing directly upwards, and a second position, wherein an accommodated storage container is inclined at the third angle relative to the vertical, i.e. has an opening facing upward and inclined at the third angle relative to the vertical.

In an embodiment of the access station, the first angle is substantially equal to the second angle. In the present specification, the term "substantially equal" is intended to mean that the size of the first angle differs from the size of the second angle by less than 25%.

In an embodiment of the access station, the first angle is equal to the second angle.

In an embodiment of the access station, the first angle and the second angle may each be within a range of 2-10 degrees, 3-8 degrees or 4-7 degrees.

In an embodiment of the access station, the centreline of a storage container accommodated in the container holder may be inclined relative to a vertical when the container holder is in the second position, such that an opening of the storage container will face away from the axis of rotation. In other words, when the container holder is in the second position, a top opening of an accommodated storage container will be inclined in order to face an operator.

In an embodiment, the access station may comprise a rotation assembly to which the container holder is connected, the rotation assembly is arranged to rotate the container holder about the axis of rotation.

In an embodiment of the access station, the rotation assembly may comprise a rotary shaft to which the container holder is operatively connected.

In an embodiment of the access station, the rotary shaft may have a centreline corresponding to the axis of rotation.

In an embodiment, the access station may comprise an electrical motor configured to rotate the container holder about the axis of rotation.

In an embodiment of the access station, the electric motor is configured to rotate the rotary shaft.

In an embodiment of the access station, the centreline of a storage container accommodated by the container holder may be gradually inclined from the vertical to the third angle during an arcuate movement between the first position and the second position.

In an embodiment of the access station, the rotation assembly may comprise a radially extending structure which is arranged to rotate about the axis of rotation and on which the container holder is supported for transporting a storage container in an arcuate path between the first position (i.e. a container loading/unloading position) and the second position (i.e. a container accessing position).

In an embodiment, the access station may comprise two container holders positionable, or positioned, on opposite sides of the axis of rotation, such that one of the container holders is in the first position when the other container holder is in the second position. In other words, the access station may comprise a first container holder and a second container holder positionable on opposite sides of the axis of rotation relative to each other, such that the first container holder is in the first position when the second container holder is in the second position In an embodiment of the access station, the two container holders may be connected to the rotation assembly on opposite sides of the axis of rotation.

Alternatively, the access station according to the first aspect may be defined as an access station for a storage system, the access station comprising at least one container holder arranged to rotate about an axis of rotation, wherein the axis of rotation is inclined at a first angle relative to a vertical; and the container holder is arranged to support a storage container by at least one support surface and is configured such that a line perpendicular to a plane of the at least one support surface is inclined at a second angle relative to the axis of rotation, wherein the container holder may rotate between a first position, where the line is vertical, and a second position being opposite the first position relative to the axis of rotation, where the line is inclined at a third angle relative to the vertical, the third angle being equal to the sum of the first angle and the second angle.

The at least one support surface is arranged to support a storage container in a vertical direction.

In an embodiment of the access station, the centreline of a storage container may correspond to a centreline of the container holder.

Alternatively, the access station according to the first aspect may be defined as an access station for a storage system, the access station comprising at least one container holder arranged to rotate about an axis of rotation, wherein the axis of rotation is inclined at a first angle relative to a vertical; and the container holder is arranged to accommodate a storage container and is configured such that a centreline of the container holder is inclined at a second angle relative to the axis of rotation, wherein the container holder may rotate between a first position, where the centreline is vertical, and a second position being opposite the first position relative to the axis of rotation, where the centreline is inclined at a third angle relative to the vertical, the third angle being equal to the sum of the first angle and the second angle.

Alternatively, the access station according to the first aspect may be defined as an access station for a storage system, the access station may comprise a radially extending structure which is arranged to rotate about an axis of rotation and on which a container holder is supported for transporting a storage container in an arcuate path between a container loading position and a container accessing position, wherein the axis of rotation is inclined at a first angle relative to a vertical; and the container holder is inclined at a second angle to a radial plane perpendicular to the axis of rotation, the inclination of the container holder being set to tilt the storage container as it is being transported from the container loading position to the container access position.

In an embodiment of the access station, the first angle and the second angle is set such that the container holder is horizontal in the container loading position and inclined away from the container loading position when in the container accessing position.

In an embodiment of the access station, the container holder may be rotated between the container loading position, where a storage container being transported by the container holder is upright, and the container accessing position being opposite the container loading position relative to the rotational axis, where a storage container is tilted by the container holder at a third angle relative to the vertical, the third angle being equal to the sum of the first angle and the second angle.

In a second aspect, the present invention provides a storage system comprising an access station according to any of the preceding claims, wherein the storage system features a port column, through which storage containers may be transferred in a vertical direction, arranged above the access station such that a storage container may be delivered to a container holder of the access station when the container holder is arranged in the first position.

In an embodiment, the storage system comprises vertical column profiles defining a plurality of grid columns, the grid columns comprise storage columns, in which storage containers can be stored one on top of another in vertical stacks, and at least one of the grid columns is a port column, each of the grid columns being defined by four vertically extending column profiles, and the column profiles are interconnected at their upper ends by top rails forming a horizontal top rail grid of the storage grid, and the access station comprises a framework connected to a lower end of the port column.

In a third aspect, the present invention provides a method of presenting a storage container for access at an access station according to any of the embodiments of the first aspect, the method comprising the steps of:

a. lowering the storage container onto a container holder when the container holder is in the first position and arranged to hold the storage container in an upright configuration; and b. rotating the container holder about the axis of rotation from the first position to the second position in which the container holder is arranged to tilt the storage container.

In an embodiment of the method, the container holder is arranged to tilt the storage container in a direction away from the first position when in the second position.

In an embodiment of the method, the storage container is gradually tilted during rotation from the first position to the second position.

BRIEF DESCRIPTION OF THE DRAWINGS

Embodiments of the invention is described in detail by reference to the following drawings.

DETAILED DESCRIPTION OF THE INVENTION

Figure 1:
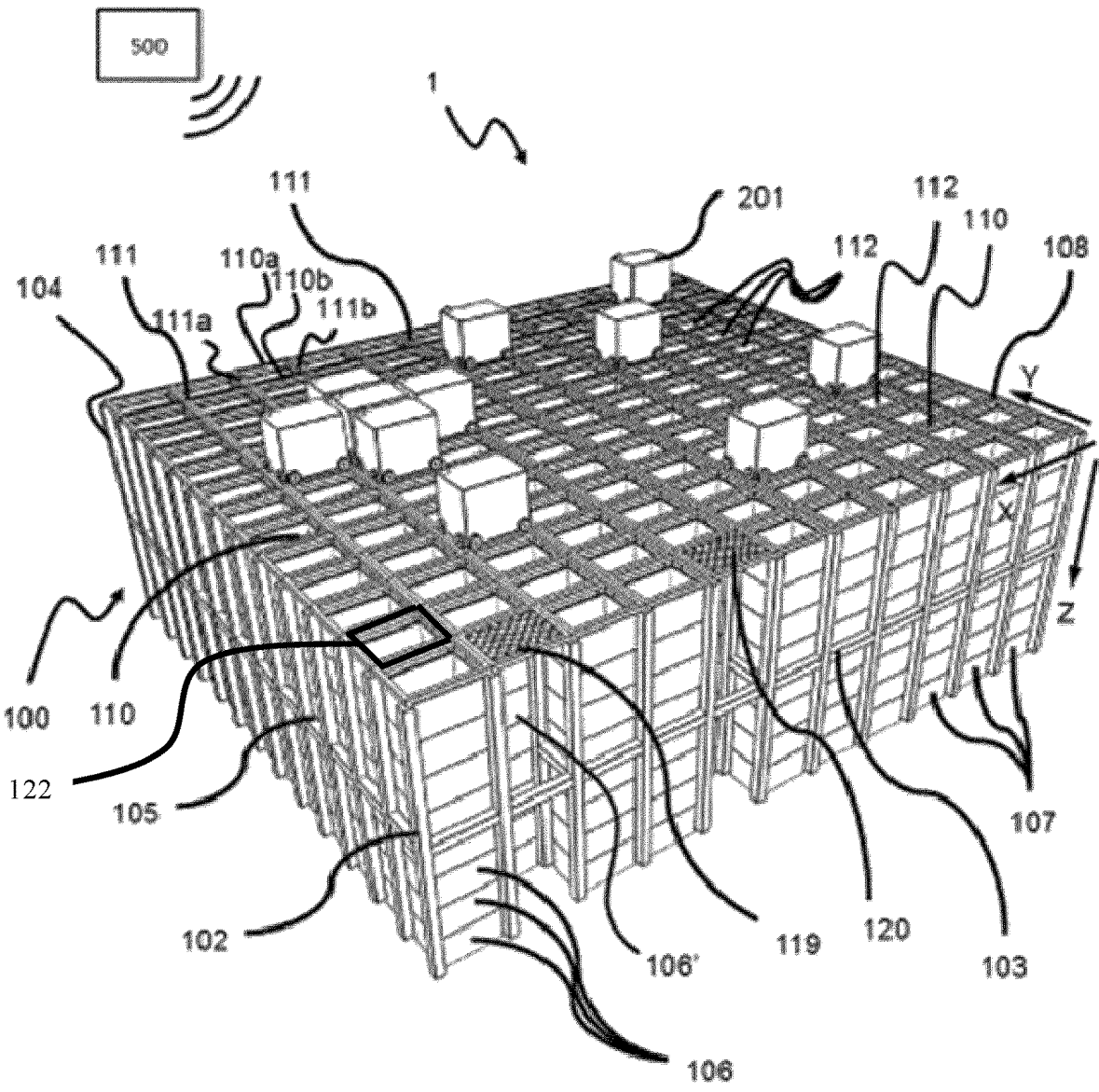
FIG. 1 is a perspective view of a framework structure of a prior art automated storage and retrieval system.
Figure 2:
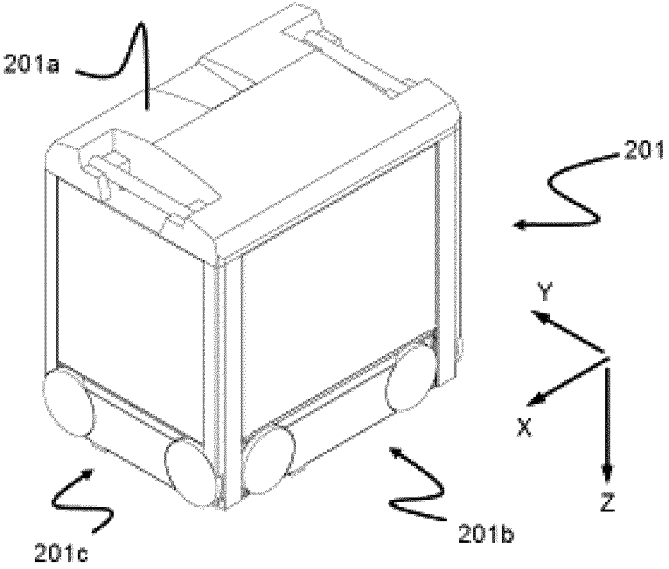
FIG. 2 is a perspective view of a prior art container handling vehicle having a centrally arranged cavity for carrying storage containers therein.
Figure 3:
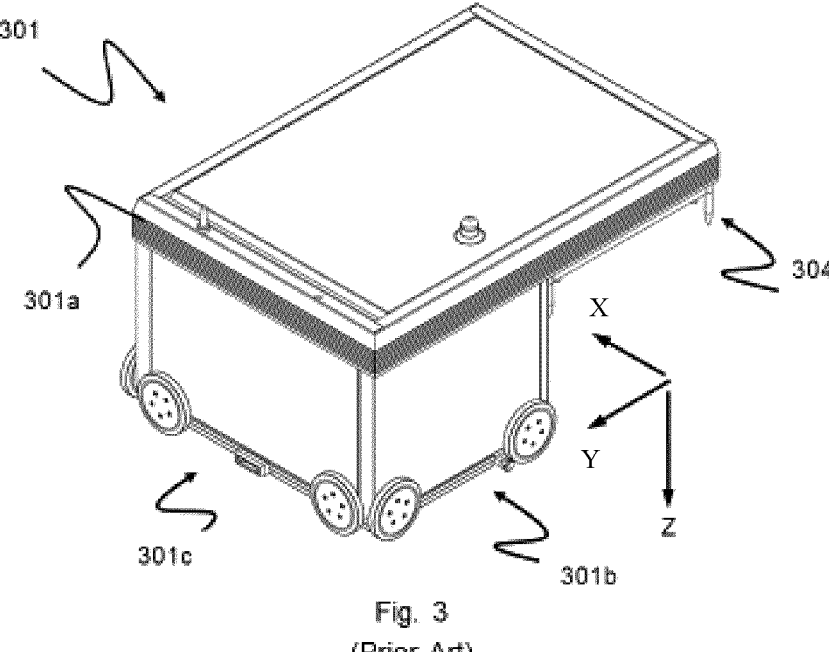
FIG. 3 is a perspective view of a prior art container handling vehicle having a cantilevered section for carrying storage containers underneath.
Figure 4:
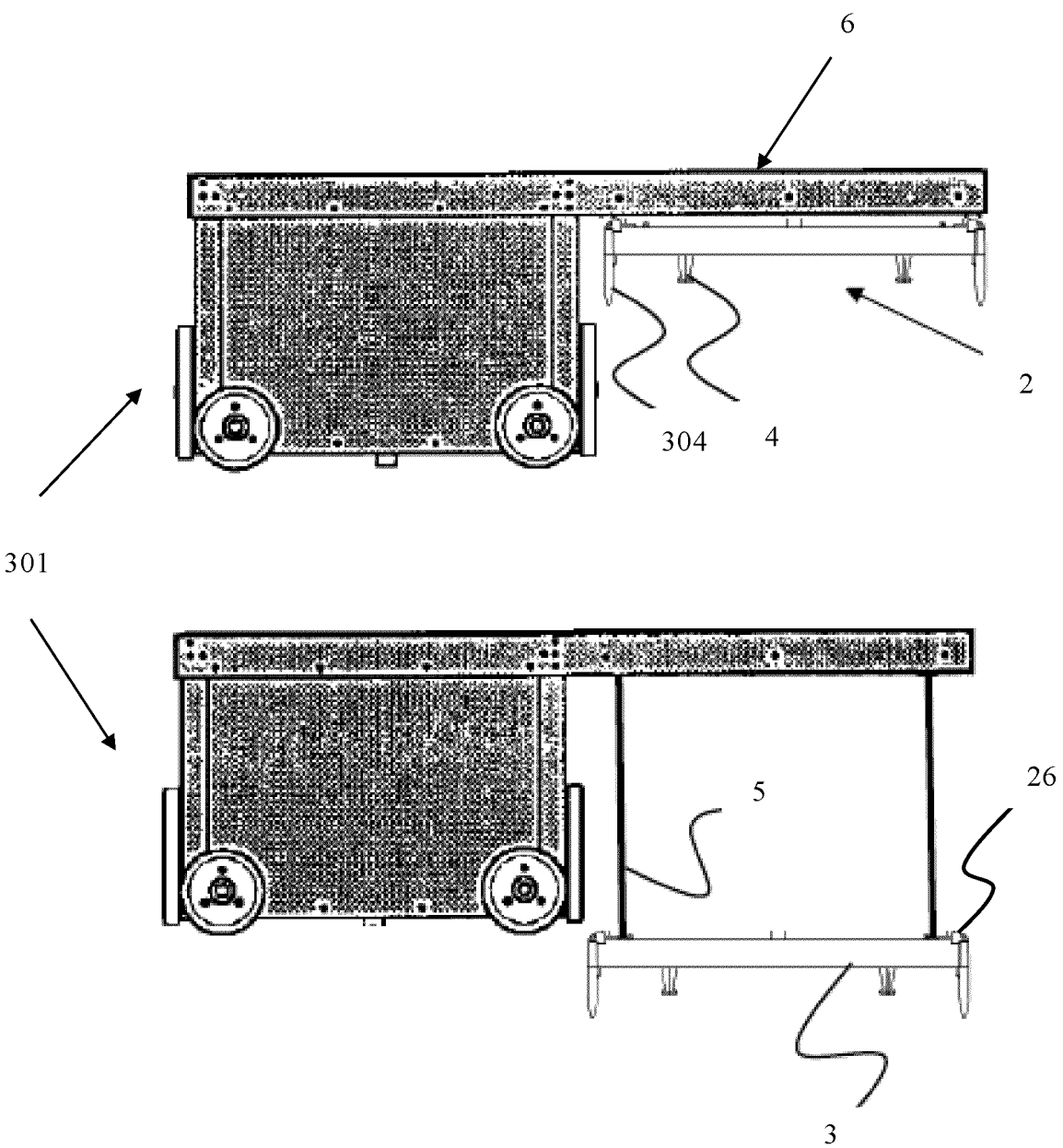
FIG. 4 are side views of the container handling vehicle in FIG. 3, wherein a lifting device is shown.

In the following, embodiments of the invention will be discussed in more detail with reference to the appended drawings. However, the drawings are not intended to limit the invention to the subject-matter depicted in the drawings.

The inventive access station was developed for use in a prior art storage system as shown in FIG. 1 and described in detail above. However, the access station may advantageously be used in any type of system, including various container storage systems, wherein access to a container is required.

The main goal of the present invention is a simple, low-maintenance access station, wherein a storage container provided to the access station may be moved and inclined towards an operator in an ergonomically advantageous manner.

Figure 5:
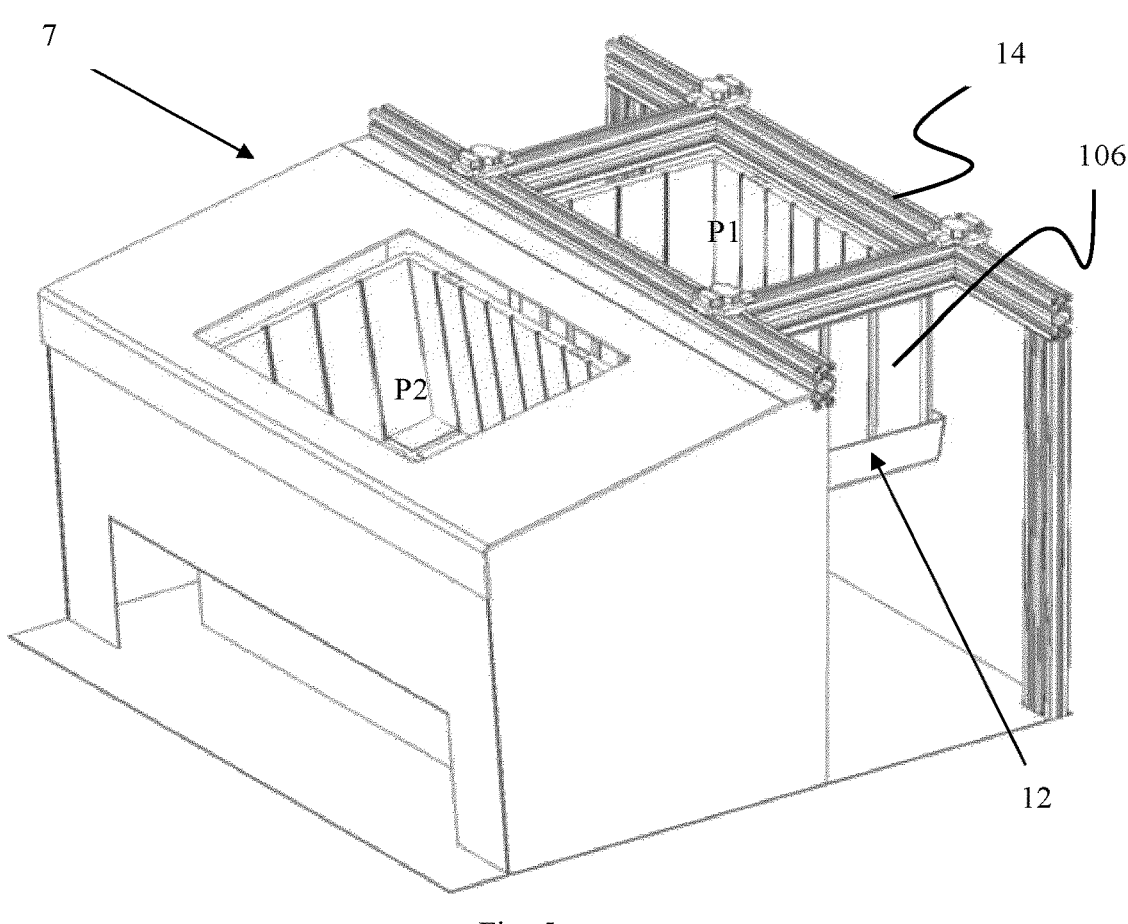
FIG. 5 is a perspective view of an exemplary access station according to the invention.
Figure 6:
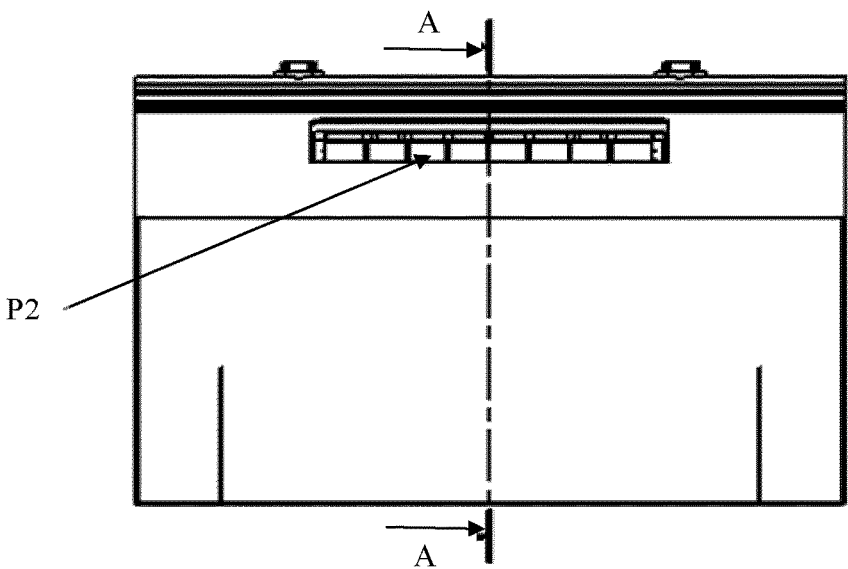
FIG. 6 is a front view of the access station in FIG. 5.
Figure 7:
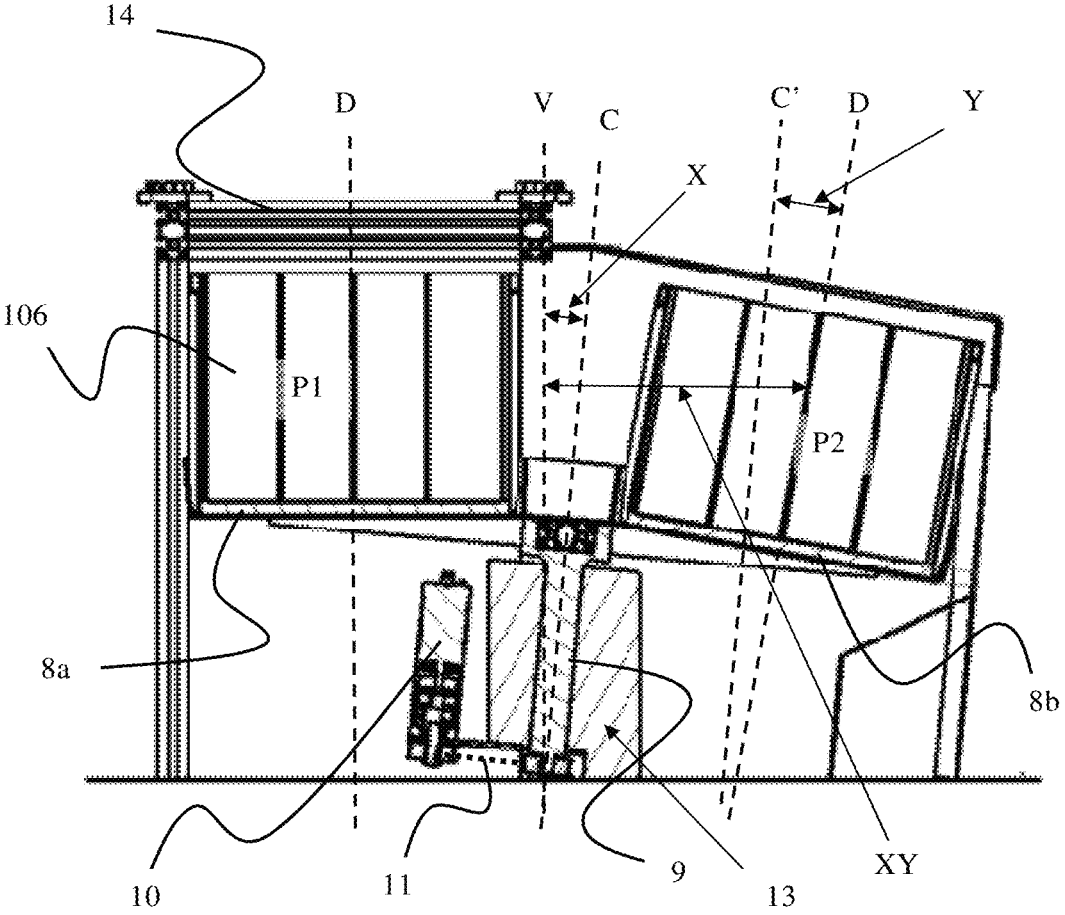
FIG. 7 is a cross-sectional view of the access station in FIG. 5.
Figure 8:
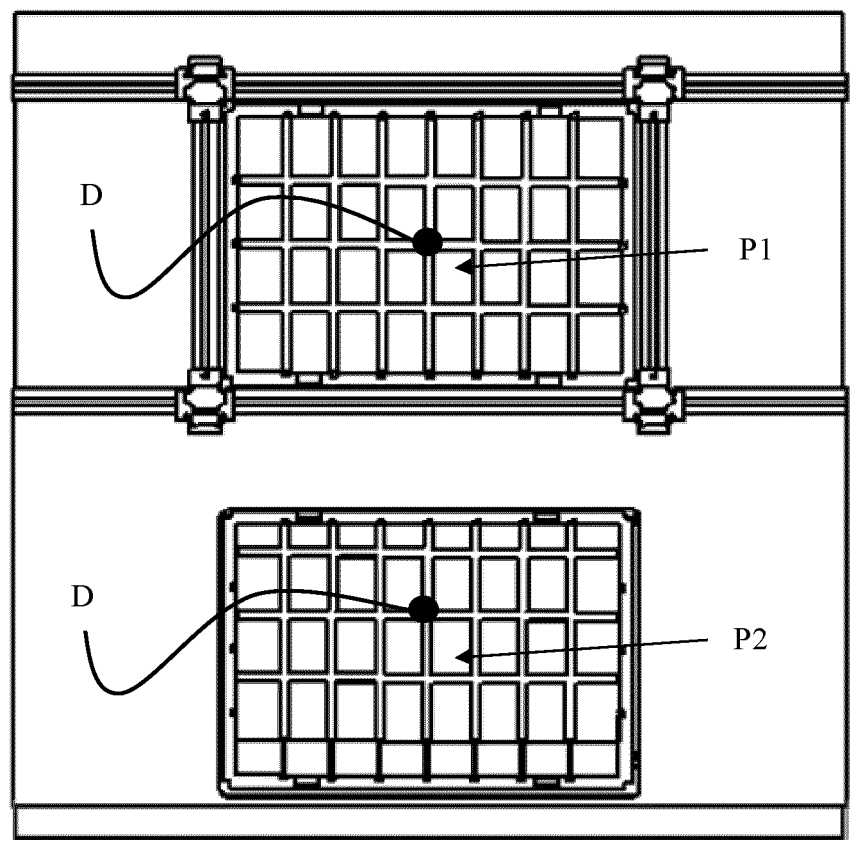
FIG. 8 is a topside view of the access station in FIG. 5.

An exemplary embodiment of the access station according to the invention is shown in FIGS. 5-7.

The access station features a first container holder 8a and a second container holder 8b operatively connected to a rotation assembly featuring a rotary shaft 9 and a shaft support structure 13. The container holders are arranged to rotate about an axis of rotation C between a first position P1 and a second position P2. In this embodiment, the axis of rotation C corresponds to a centreline of the rotary shaft 9.

The rotary shaft 9 is operatively connected to an electrical motor 10, in this case via a drive band 11. Other arrangements for connecting the rotary shaft 9 to an electrical motor are possible, for example, by gears or by use of direct drive motors.

Each of the container holders 8a,8b can accommodate a storage container 106. In this embodiment, each of the container holders features a tray structure 12 having a bottom support surface and vertical edges to hold a storage container in place. In other embodiments of the access station, the container holders may for instance be similar to the ones disclosed in WO 2019/076516 A1. In yet further embodiments, each of the container holders may be rotatable about an internal axis as shown in WO 2012/026824 A1.

The axis of rotation C, or the centreline of the rotary shaft 9, is inclined at a first angle X with respect to the vertical V, see FIG. 7. The first and the second container holders 8a,8b are configured, and/or inclined, such that the centreline D of an accommodated storage container 106 is inclined at a second angle Y relative to the axis of rotation C. The second angle Y is such that an opening of a storage container will face away from the axis of rotation C. In this specification, the centreline D of a storage container 106 is a line being perpendicular to a plane of the storage container bottom and intersecting the centre of said bottom.

The result of having the axis of rotation C and the container holders 8a,8b configured, and/or inclined, such that an accommodated storage container is inclined at the respective first and second angle is that a storage container is held horizontally when accommodated by a container holder in the first position and inclined towards an operator by an angle of X+Y (i.e. a third angle) when in the second position.

In the illustrated embodiment, the first angle X and the second angle Y are both 5 degrees, and the third angle is consequently 10 degrees. In other embodiments, the first angle X and the second angle Y will preferably be within the range of 1 to 10 degrees.

A common feature of the illustrated container holders, and the container holder disclosed in WO 2019/076516 A1, is the presence of at least one container support surface upon which an accommodated storage container is supported, e.g. the bottom support surface of the tray structure 12. The support surface(s) will commonly be arranged in a support plane being parallel to the plane of the bottom of an accommodated storage container. A line being perpendicular to the support plane will consequently be inclined at the same angle relative to the axis of rotation C as the centreline D of an accommodated storage container. The inclination of the container holders, or the inclination of the support plane, may also be defined in relation to a radial plane perpendicular to the axis of rotation C by use of the second angle Y.

The container holder 8a,8b may take other forms, e.g. as discussed above. The purpose of the container holder 8a,8b is to hold and support the storage container 106 as it is rotated from the first position P1 to the second position P2 for access at the access station 7, and back again for alignment with the port column 119, 120.

When arranged in a storage system 1 as shown in FIG. 1, the access station 7 is arranged such that the each of the first and second container holders 8a,8b is below a port column 119,120 when in the first position P1 to receive/deliver a storage container from/to the storage grid. Via the port column 119,120, a storage container 106 may be transferred from the top of the framework structure 100 to the container holder 8a,8b in the first position P1 by use of a container handling vehicle 201,301 or a container lift. The access station may comprise a station framework 14 for connection to a lower end of a port column 119,120.

The invention claimed is:

1. An access station for a storage system, the access station comprises at least one container holder arranged to rotate about an axis of rotation, wherein the axis of rotation is inclined at a first angle relative to a vertical; and the container holder is arranged to accommodate a storage container and is configured such that a centreline of the storage container when supported by the container holder is inclined at a second angle relative to the axis of rotation, wherein the container holder may rotate between a first position, where the centreline of an accommodated storage container is vertical, and a second position being opposite the first position relative to the axis of rotation, where the centreline of an accommodated storage container is inclined at a third angle relative to the vertical, the third angle being equal to the sum of the first angle and the second angle.

2. An access station according to claim 1, wherein the first angle is substantially equal to the second angle.

3. An access station according to claim 1, wherein the first angle and the second angle are each within a range of 2-10 degrees.

4. An access station according to claim 1, wherein the centreline of a storage container accommodated in the container holder is inclined relative to a vertical when the container holder is in the second position, such that an opening of the storage container will face away from the axis of rotation.

5. An access station according to claim 1, comprising a rotation assembly to which the container holder is connected, the rotation assembly arranged to rotate the container holder about the axis of rotation.

6. An access station according to claim 5, wherein the rotation assembly comprises a rotary shaft to which the container holder is operatively connected.

7. An access station according to claim 6, wherein the rotary shaft has a centreline corresponding to the axis of rotation.

8. An access station according to claim 6, wherein an electric motor is configured to rotate the rotary shaft.

9. An access station according to claim 1, comprising an electrical motor configured to rotate the container holder about the axis of rotation.

10. An access station according to claim 1, wherein the centreline of a storage container accommodated by the container holder is gradually inclined from the vertical to the third angle during an arcuate movement between the first position and the second position.

11. An access station according to claim 5, comprising two container holders positionable on opposite sides of the axis of rotation, such that one of the container holders is in the first position when the other container holder is in the second position.

12. An access station according to claim 11, wherein the two container holders are mounted to the rotation assembly on opposite sides of the axis of rotation.

13. A storage system comprising:

an access station comprising at least one container holder arranged to rotate about an axis of rotation, wherein the axis of rotation is inclined at a first angle relative to a vertical; and the container holder is arranged to accommodate a storage container and is configured such that a centreline of the storage container when supported by the container holder is inclined at a second angle relative to the axis of rotation, wherein the container holder may rotate between a first position, where the centreline of an accommodated storage container is vertical, and a second position being opposite the first position relative to the axis of rotation, where the centreline of an accommodated storage container is inclined at a third angle relative to the vertical, the third angle being equal to the sum of the first angle and the second angle;

wherein the storage system features a port column, through which storage containers may be transferred in a vertical direction, arranged above the access station such that a storage container may be delivered to a container holder of the access station when the container holder is arranged in the first position.

14. A method of presenting a storage container for access at an access station, the access station comprising:

at least one container holder arranged to rotate about an axis of rotation, wherein the axis of rotation is inclined at a first angle relative to a vertical; and the container holder is arranged to accommodate a storage container and is configured such that a centreline of the storage container when supported by the container holder is inclined at a second angle relative to the axis of rotation, wherein the container holder may rotate between a first position, where the centreline of an accommodated storage container is vertical, and a second position being opposite the first position relative to the axis of rotation, where the centreline of an accommodated storage container is inclined at a third angle relative to the vertical, the third angle being equal to the sum of the first angle and the second angle, the method comprising:

lowering the storage container onto a container holder when the container holder is in the first position and arranged to hold the storage container in an upright configuration; and rotating the container holder about the axis of rotation from the first position to the second position in which the container holder is arranged to tilt the storage container.

15. The method according to claim 14, wherein the container holder is arranged to tilt the storage container in a direction away from the first position when in the second position.

16. The method according to claim 14, wherein the storage container is gradually tilted during rotation from the first position to the second position.

* * * * *